Nov. 19, 1968 K. G. CROWE 3,411,708
BEARING BRACKET CONSTRUCTION FOR BLOWER WHEEL HOUSING
Filed March 31, 1967 2 Sheets-Sheet 1

INVENTOR.
KENNETH G. CROWE
BY
ATTORNEYS

Nov. 19, 1968 K. G. CROWE 3,411,708
BEARING BRACKET CONSTRUCTION FOR BLOWER WHEEL HOUSING
Filed March 31, 1967 2 Sheets-Sheet 2
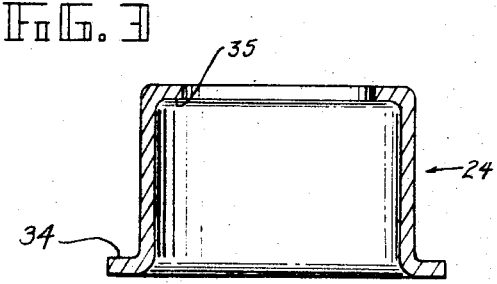
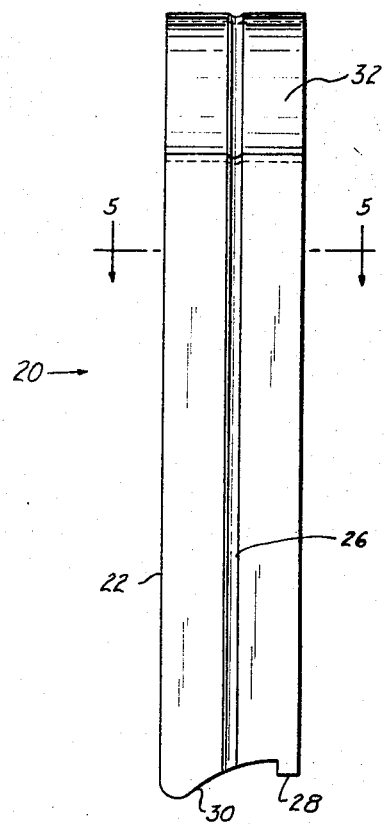
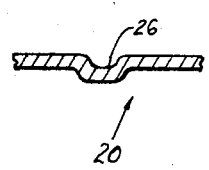

United States Patent Office 3,411,708
Patented Nov. 19, 1968

3,411,708
BEARING BRACKET CONSTRUCTION FOR
BLOWER WHEEL HOUSING
Kenneth G. Crowe, Rhode-Saint-Genese, Belgium, assignor to The Torrington Manufacturing Company, Torrington, Conn., a corporation of Connecticut
Filed Mar. 31, 1967, Ser. No. 627,357
10 Claims. (Cl. 230—132)

ABSTRACT OF THE DISCLOSURE

Two brackets engage opposite sides of a cup in which a bearing is received for rotatably supporting a blower wheel drive shaft. Each bracket is formed from a strip of resilient sheetmetal and has two leg portions, each of which terminates in a tab which is received in a slot defined for this purpose in the inlet opening of the blower wheel housing. The leg portions are arranged radially in the opening when assembled with the cup. An inner portion of each bracket is arcuately shaped to fit the exterior surface of the cup and engages a radially outwardly turned flange on the cup to restrain the cup against axial movement in one direction. A radially inwardly turned flange on the opposite end of the cup restrains the bearing against movement in said one direction and a thrust washer on the blower wheel drive shaft engages the bearing on assembly to restrain the cup and bearing against movement in the opposite axial direction.

Summary of invention

This invention relates to brackets for rotatably supporting a blower wheel drive shaft in the inlet of a blower wheel housing, and deals more particularly with a novel bracket construction which is structurally rigid enough to support the blower wheel drive shaft while comprising a relatively small number of easily assembled parts.

A general object of the present invention is to provide a bracket construction for mounting a conventional blower wheel drive shaft bearing in the inlet of a blower wheel housing without employing conventional fastening means, such as screws, rivets or weldments or the like, with the result that the time and effort required to assemble the various parts of the bracket construction is significantly reduced over that possible with the prior art bracket constructions.

Another general object of the present invention is to provide a mounting bracket construction which is not only easily assembled, but is also well adapted to high quantity low cost production.

The drawings show a preferred embodiment of the invention and such embodiment will be described, but it will be understood that various changes may be made from the construction disclosed, and that the drawings and description are not to be construed as defining or limiting the scope of the invention, the claims forming a part of this specification being relied upon for that purpose.

Brief description of drawings

FIG. 3 is a sectional view through the bearing cup shown broken away in FIG. 1, and in full in FIG. 2.

FIG. 4 is a detailed view of one of the mounting brackets shown in FIGS. 1 and 2.

FIG. 5 is an enlarged sectional view taken along the line 5—5 of FIG. 4.

Detailed description of drawings

Figure 1:
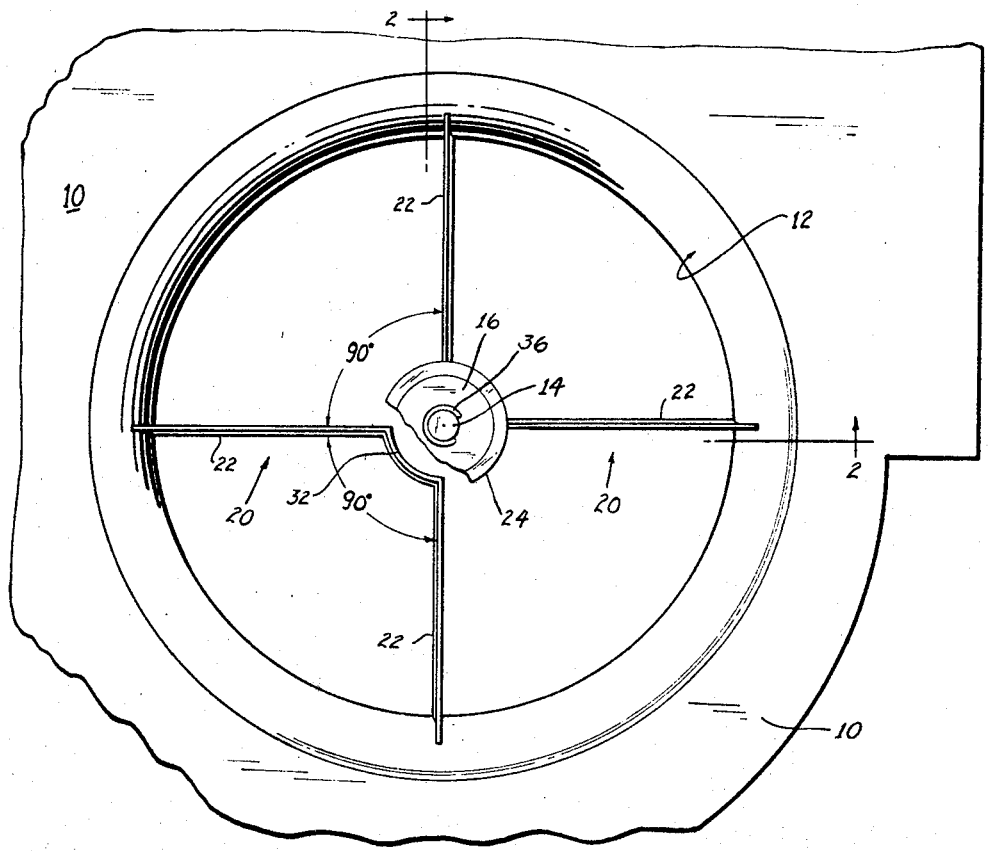
FIG. 1 is an elevational view of that portion of the blower wheel housing which defines the air inlet, showing a pair of bearing mounting brackets of the present invention, together with a cup for the bearing itself, the latter being shown broken away.
Figure 2:
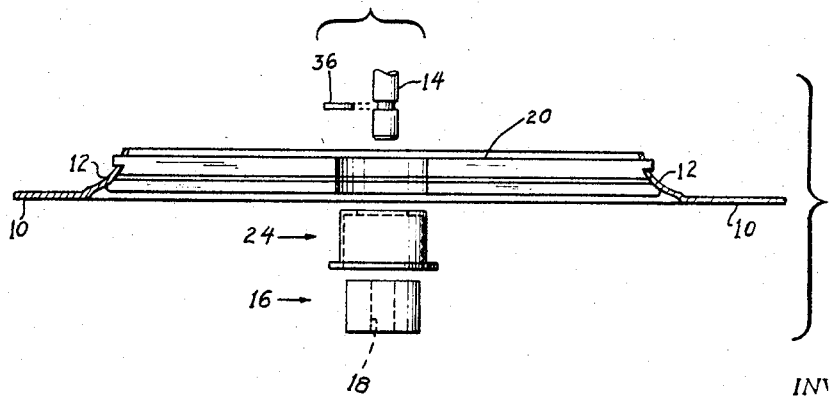
FIG. 2 is a sectional view taken along the line 2—2 of FIG. 1 showing a bearing and a blower wheel drive shaft in exploded relation to the inlet defining portion of the blower wheel housing and the apparatus of FIG. 1.

Turning now to the drawings in greater detail, FIG. 1 shows in pertinent part, a portion of a typical centrifugal type blower wheel housing 10 having a circular inlet defining portion 12 through which air is drawn by a blower wheel (not shown), rotatably mounted inside the housing 10. As best shown in FIG. 2, the portion of the blower wheel housing 10 comprises a generally flat plate, while the annular inlet defining portion 12 thereof is bent inwardly or rearwardly to form an inlet which is flared so as to direct the air into the blower in an efficient manner. It should perhaps be noted that the flared inlet 12 may comprise an integral part of the generally flat housing 10, or may comprise an annular ring which is attached to the side wall of the blower housing by conventional means. It is also noted that with certain types of blower wheel constructions, such an inlet might be provided on opposite sides of the blower housing and it is further noted that the mounting bracket construction to be disclosed hereinbelow is well adapted for use with either centrifugal blower housings of a single inlet design or those with an inlet at either side thereof.

In accordance with the disclosed embodiment of the present invention, a pair of mounting brackets 20, 20 are provided for receiving a circular cup 24 in which a bearing 16 is in turn provided for rotatably supporting the blower wheel drive shaft 14 as best shown in FIG. 2 where these parts are shown in exploded relation to the inlet 12. As shown the bearing 16 comprises a conventional bearing which has a central opening 18 for receiving the shaft 14. The construction shown provides a convenient means for securing the bearing 16 in centered relation in the annular inlet 12. In place of the usual spider arrangement provided for this purpose the pair of generally M-shaped mounting brackets 20, 20 are positioned in the inlet as shown in FIG. 1 so that outwardly extending leg portions 22, 22 span the inlet opening and are held in place by the annular collar or cup 24, which is adapted to receive the conventional bearing 16 as suggested in FIG. 2.

Each mounting bracket 20 preferably comprises a bent strip of sheet metal having a strengthening bead or rib 26 formed or stamped throughout its entire length as best shown in FIGS. 4 and 5. From FIG. 4 it will be seen that each radially outwardly extending leg portion 22 has an end portion which defines a tab 28 adjacent its marginal side edge for fitting into a slot defined for this purpose in the annular inlet defining portion 12 of the blower wheel housing 10. Still with reference to the end portion of each such leg portion 22, an arcuate segment 30 is defined immediately adjacent each of said tabs 28, 28 which arcuate segment 30 is formed so as to fit the flared periphery of the blower wheel inlet defining portion as best shown in FIG. 2 when the tabs 28, 28 are fitted into the above-mentioned slots in the inlet 12.

Still with reference to the mounting bracket 20, each of its associated leg portions 22, 22 will be seen to be arranged at approximately a 90° angle with respect to a corresponding leg portion of the other mounting bracket in a particular inlet as best shown in FIG. 1, and each of the leg portions 22, 22 of a particular mounting bracket 20 will also be seen to be arranged at approximately a 90° angle with respect to one another. The mounting brackets 20, 20 are each arranged edgewise so as to present a minimum obstruction to the flow of air into the inlet 12, and the width of each such bent sheet metal bracket 20 will be seen from FIG. 2 to correspond at least approximately to the axial width of the flared inlet defining portion 12 of the blower housing 10.

Each bracket 20 further includes an intermediate portion 32 between said leg portions 22, 22 which is located radially inwardly with respect to said leg portions and is arcuately formed so as to fit the exterior surface of the annular collar or cup 24. As so constructed and arranged the collar 24 can be inserted between a pair of similarly formed mounting brackets 20, 20 in the annular inlet as shown in FIG. 1. The inner, or intermediate portion 32, of each mounting bracket 20 will be seen to abut opposite sides of the collar or cup 24 and more particularly to engage a substantial portion of the exterior surface of said cup 24 so as to securely hold the same in assembled relation. Alternatively, the cup 24 could be pre-assembled with a pair of brackets 20, 20 (either by hand or by some permanent method such as welding) and the resulting assembly forced into the inlet by deforming the flared periphery of the blower wheel inlet. The latter would readily spring back to approximately its undeformed configuration as the tabs 28, 28 snapped into the slots provided for this purpose and the arcuate segments 30, 30 would abut the flared inlet so as to firmly anchor the entire assembly in place as described hereinabove.

The cup or collar 24 will be seen from FIG. 3 to have a radially outwardly turned annular flange 34 for abutting the axially outwardly facing edge of each of the brackets 20, 20 and an inwardly turned annular flange 35 at the opposite end of the cup 24 so as to engage the inner axial end of the journal bearing 16 upon assembly of the latter in the cup 24. As shown in FIG. 2 the bearing 16 may be secured against movement out of the cup 24 by a thrust washer 36, or other similar device which is received on the drive shaft 14 as shown. Alternatively, a drive pulley might also be provided on the shaft 14, in which case it could serve to hold the journal bearing 16 in the cup 24.

In the following claims the term "bearing means" is used to define the cup 24 and the journal bearing 16 which is received therein. It will of course be apparent that other types of bearing assemblies fall within the scope of the term "bearing means" as used in the appended claims. For example, an anti-friction bearing might be used in which the outer raceway is provided with an integral flange for securing the bearing against movement axially inwardly of the inlet opening. Alternatively, a conventional anti-friction bearing might be used with detents provided either on the struts or on the outer raceway to receive protuberances on the other of said parts.

Finally, it is noted that the dimensions of the bracket leg portions in relation to the respective diameters of the cup and the flared inlet opening are somewhat critical in that the brackets and cup must fit quite snugly in the inlet opening in order to realize the full advantages of the present invention. Preferably, at least one of these parts is resilient enough to permit assembly in the inlet opening only by applying some axial force to the cup so that the bracket leg portions, the cup and/or the flared inlet are slightly stressed in assembly to hold the various parts in assembled relation.

What is claimed is:

1. In a blower wheel housing having an inlet opening in which a blower wheel drive shaft bearing means is to be supported, the improvement comprising a bearing means including an annular element having generally radially outwardly exposed surfaces, at least two mounting brackets for said bearing means, each of said brackets having outwardly extending angularly spaced leg portions for engaging the peripheral inlet defining portion of said housing and inner portions which abut said outwardly facing surfaces on said bearing means, at least one of said elements comprising said inlet, said bearing means and brackets being resilient and being stressed slightly in assembled relationship whereby said elements serve to hold each other in assembled relation in said inlet opening.

2. The combination of claim 1 and further characterized by means for restraining said bearing means against axial movement in at least one direction with respect to said brackets.

3. The combination of claim 2 and further characterized by means for restraining said brackets against axial movement in said inlet.

4. The combination of claim 3 further characterized in that said means for restraining said brackets against movement in said axial direction comprises tabs formed in the outwardly extending leg portions thereof, said tabs fitting into corresponding slots defined for this purpose in the peripheral inlet defining portion of said housing.

5. The combination set forth in claim 2 further characterized in that said means for restraining said bearing means against axial movement comprises a flange on said annular bearing element.

6. The combination of claim 3 further characterized in that each of said brackets comprises a bent strip of sheet metal, said means for restraining said brackets comprising tabs formed in the outwardly extending leg portions thereof, each of said inner bracket portions comprising a portion thereof intermediate said leg portions, and said annular bearing element includes an annular flange for restraining said bearing means against axial movement in at least one direction.

7. The combination as set forth in claim 6 further characterized in that said bent sheet metal bracket is arranged edge wise to the flow of air into said inlet opening, said inner-intermediate portion thereof being arcuately bent to fit the exterior surface of said annular element and to thereby abut a substantial portion thereof.

8. The combination as set forth in claim 7 further characterized in that said annular element comprises an annular cup having a radially inwardly turned annular flange for receiving the inner axial end of a conventional bearing, and said annular flange extending radially outwardly on said cup for abutting the axially outwardly facing edge of said bracket inner portions whereby said blower wheel drive shaft can be received in said bearing and said shaft and bearing means restrained against axial movement in a direction opposite said one direction by a conventional thrust washer or the like.

9. The combination as set forth in claim 8 further characterized in that each of said brackets has a width in said axial direction corresponding at least approximately to the axial width of the flared periphery of said blower housing inlet defining portion.

10. The combination as set forth in claim 9 further characterized in that each tab defining end portion of said brackets includes an arcuate segment formed to fit the flared periphery of said blower housing inlet defining portion.

References Cited
UNITED STATES PATENTS

| | | | |
|---|---|---|---|
| 1,270,232 | 6/1918 | Steenstrup | 253—775.1 |
| 1,502,862 | 7/1924 | Menk | 230—120 |
| 2,700,500 | 1/1955 | Wren | 230—273 |
| 2,722,464 | 11/1955 | Galaba | 230—128 |
| 3,157,351 | 11/1964 | Sevald | 230—120 |
| 3,339,831 | 9/1967 | Ranz | 230—128 |

HENRY F. RADUAZO, *Primary Examiner.*